C. H. GUARD.
Attaching Hubs to Axles.
No. 58,247. Patented Sept. 25, 1866.
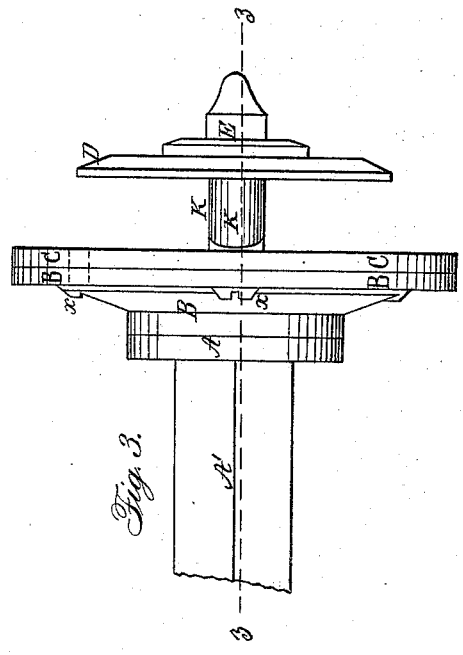
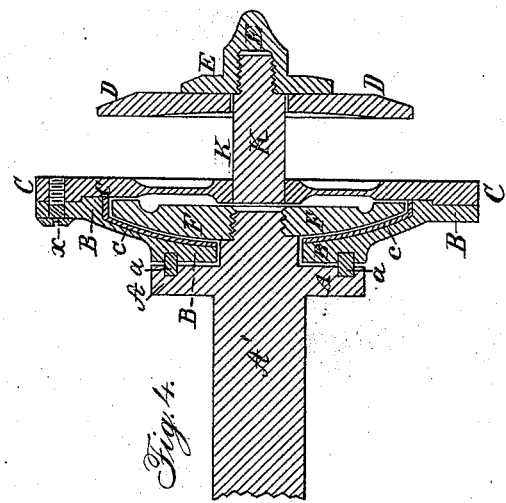
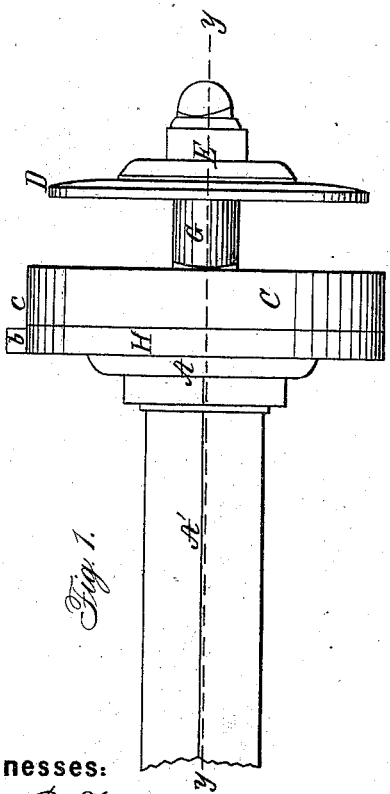
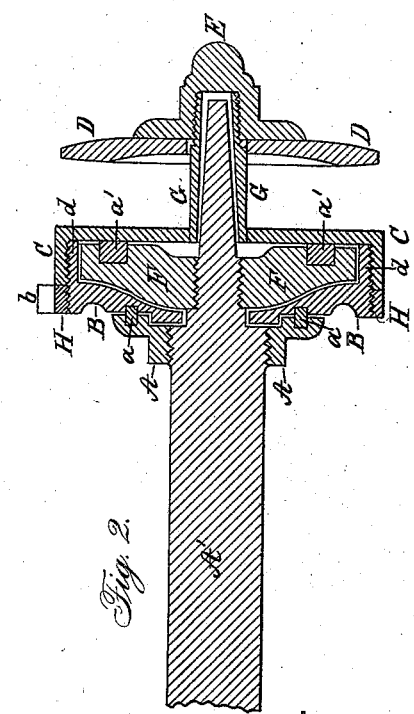
Witnesses:
Inventor:

UNITED STATES PATENT OFFICE.

CHAUNCY H. GUARD, OF NEW YORK, N. Y.

IMPROVEMENT IN ATTACHING HUBS TO AXLES.

Specification forming part of Letters Patent No. 58,247, dated September 25, 1866; antedated September 17, 1866.

*To all whom it may concern:*

Be it known that I, CHAUNCY H. GUARD, of the city, county, and State of New York, have invented a new and useful Improvement in Attaching Metal Hubs to Axles; and I do hereby declare the following to be a full, clear, and exact description of the same, reference being had to the accompanying drawings, forming a part of this specification, in which—

Figure 1 is a side elevation of my improved hub attachment complete in all its parts; Fig. 2, a longitudinal section through the line $y\ y$ of Fig. 1; Fig. 3, a side elevation of a hub, showing a modification of Figs. 1 and 2; and Fig. 4, a longitudinal section through the line $z\ z$, Fig. 3.

Similar letters of reference indicate like parts in each of the figures.

The nature of my invention consists, first, in combining with the inner side of the hub of a wheel two circular bearing-plates, B and C, so formed and arranged as that, when united, they shall inclose an interior space, forming a journal-box for a convexical journal-disk, F, secured on the end of an axle; second, in uniting said bearing-plates by means of screws, Fig. 3, or in screwing them together, Fig. 2, so as to make their bearing upon the journal-disk of the axle and upon the prolonged axle itself readily adjustable; third, in giving to the journal-disk and to the prolonged end of the axle a conoidal or convexed shape counterpart to that of their bearings, so as to obtain compensation in wear and facility in the adjustment thereof.

By means of these improvements a cheap adjustable attachment of the hub to the axle is obtained, of superior strength, and which, by bringing the center of support nearer the center of the axle and upon its heaviest part, instead of, as usual, upon an extended spindle, admits of the use of a much neater and lighter axle with spring-vehicles than is commonly used.

I contemplate using these my improvements either with or without an extended spindle upon the axle. Figs. 1 and 2 represent my invention as applied to an axle terminating in extended spindles, which in such case I make of a tapering or conical form, as illustrated in Fig. 2.

Against the shoulder upon the end of the axle from whence the spindle springs I place the annular bearing-plate B, whose inner face is of a concave form, as seen in Fig. 2 of the drawings, and whose rim is furnished with an inwardly-projecting flange, $d$, having a screw-thread cut upon its periphery. This plate revolves loosely upon the axle against its shoulder, and is held in place by means of a circular journal-disk, F, whose inner face is convex in form, and the exact counterpart of the inner face of the bearing-plate B. This journal-disk F is firmly screwed upon the axle in front of the revolving plate B, so as to become part of the former.

C is a second circular bearing-plate, having a central outwardly-projecting collar, G, which forms a hub and receives the spokes of the wheel. This second bearing-plate, C, is provided with a projecting screw-flange to overlap and screw upon the flange and rim of the first plate, B, as illustrated in Fig. 2 of the drawings, the projecting spindle of the axle passing loosely within the collar G, forming the hub of the wheel. The journal-disk F is thus embraced between and within the two bearing-plates B and C, the latter of which forms a part of the hub, which is thus secured to the axle with a firm bearing.

The spokes of the wheel may be wedged in and secured upon the collar G against the plate C by means of an outer plate, D, and a nut, E, screwing upon the end of the collar, as seen in Fig. 2, or otherwise, as may be found expedient.

It will be observed that by screwing up the front bearing, C, upon the inner bearing-plate, B, the latter will be drawn more closely against the convex surface of the journal-disk, thus tightening the bearing of the two against each other; and that, at the same time, the collar G, forming a part of the front plate, C, being drawn upon the tapering spindle of the axle, will tighten the bearing of the two at this point. Hence, the bearing throughout of the axle in the hub both upon the journal-disk and spindle is readily adjusted by simply screwing or unscrewing the plate C. An accidental movement of this plate is prevented by means of a locking-ring, H, which is screwed on upon the rim of the plate B in an opposite direction to that of the plate C firmly against the edge of said plate when it has been properly adjusted, as seen in Figs. 1 and 2 of the drawings.

Additional support is given to the plates B by means of a washer. A, screwed up against it upon the axle A', and which has a recess formed upon its front face to overlap a shoulder upon the outer face of the plate B, as seen in Fig. 2. Annular grooves are cut both upon the inner face of this washer A and upon the outer face of the journal-disk F to receive packing-rings a a', of leather or other suitable material, which will retain the lubricant provided for the bearings and ease the movement of the parts.

I contemplate forming the washer A on the axle in one piece therewith, as seen in Fig. 4, and also uniting the plates B and C by means of screws x x, instead of screwing them together, as heretofore described.

Where it is found desirable to shorten the axle, I contemplate screwing and securing the journal-disk F directly upon the end thereof, as seen in Fig. 4, in which case the hub K is made solid and in one piece with, or firmly united to, the bearing-plate C, as illustrated in the drawings.

Having thus fully described my improvements in the attachment of hubs to axles, what I claim therein as new, and desire to secure by Letters Patent, is—

The attachment of a hub to an axle by means of a convexical journal-disk formed substantially as herein described, and combined with bearing-plates secured to the inner end of the hub and embracing said disk, substantially in the manner and for the purposes herein set forth.

The foregoing specification of my improvement in the attachment of hubs to axles signed by me this 15th day of September, A. D. 1865.

CHAUNCY H. GUARD.

Witnesses:
GEORGE W. JAQUES,
STEPHEN D. GEDNEY.